(12) United States Patent
Hotta et al.

(10) Patent No.: US 10,081,312 B2
(45) Date of Patent: Sep. 25, 2018

(54) BLACK PLATED RESIN PART AND METHOD FOR MANUFACTURING THE SAME

(71) Applicant: TOYODA GOSEI CO., LTD., Kiyosu-shi, Aichi-ken (JP)

(72) Inventors: Yuji Hotta, Kiyosu (JP); Koji Nakatani, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/262,513

(22) Filed: Sep. 12, 2016

(65) Prior Publication Data

US 2017/0096113 A1 Apr. 6, 2017

(30) Foreign Application Priority Data

Oct. 6, 2015 (JP) .................. 2015-198364

(51) Int. Cl.
*B60R 13/02* (2006.01)
*C23C 18/38* (2006.01)
(Continued)

(52) U.S. Cl.
CPC .............. *B60R 13/02* (2013.01); *B32B 15/08* (2013.01); *C23C 18/1633* (2013.01);
(Continued)

(58) Field of Classification Search
CPC ......... B60R 13/00; B60R 13/02; B32B 15/08; C23C 18/38; C23C 18/32; C23C 18/1633; C23C 18/1641; C23C 18/165; C23C 18/54; C23C 18/31; C23C 38/40; C23C 28/00; C23C 28/30; C23C 28/32; C23C 30/00; C25D 5/14; C25D 3/12; C25D 3/08; C25D 5/48; C25D 3/04; C25D 3/06; C25D 3/54; C25D 5/54; C25D 11/34; C25D 9/04; C25D 11/00; C25D 11/14; C25D 11/16; C25D 11/18; C25D 11/22; C25D 11/24; C25D 11/26; Y10T 428/12556; Y10T 428/12569; Y10T 428/12611; Y10T 428/12618; Y10T 428/1266; Y10T 428/12667;
(Continued)

(56) References Cited

U.S. PATENT DOCUMENTS 5,607,521 A * 3/1997 Bech-Nielsen ......... C23C 22/40
148/261

FOREIGN PATENT DOCUMENTS

| JP | 2009-235456 A | 10/2009 |
| JP | 2010-209456 A | 9/2010 |
| JP | 2014-100809 A | 6/2014 |

* cited by examiner

Primary Examiner — Michael E. La Villa
(74) Attorney, Agent, or Firm — Posz Law Group, PLC

(57) ABSTRACT

A black plated resin part includes a resin base material, an underlying plating layer including a copper plating layer and a nickel plating layer formed in this order on the resin base material, a black chromium plating layer formed on the nickel plating layer, formed of trivalent chromium, and having a film thickness of not less than 0.15 μm, and a corrosion resistant film formed on the black chromium plating layer, formed of chromic phosphate or molybdenum phosphate, and having a film thickness of not less than 7 nm. A brightness of the black chromium plating layer seen through the corrosion resistant film is expressed by an L* value of not more than 54 based on the L*a*b* color system.

10 Claims, 1 Drawing Sheet

(51) Int. Cl.
    *C23C 18/16*     (2006.01)
    *C23C 18/32*     (2006.01)
    *C25D 3/12*     (2006.01)
    *C25D 3/08*     (2006.01)
    *C25D 5/48*     (2006.01)
    *C25D 5/14*     (2006.01)
    *C25D 3/06*     (2006.01)
    *C23C 30/00*     (2006.01)
    *B32B 15/08*     (2006.01)

(52) U.S. Cl.
    CPC .............. *C23C 18/32* (2013.01); *C23C 18/38* (2013.01); *C23C 30/00* (2013.01); *C25D 3/06* (2013.01); *C25D 3/08* (2013.01); *C25D 3/12* (2013.01); *C25D 5/14* (2013.01); *C25D 5/48* (2013.01); *Y10T 428/1266* (2015.01); *Y10T 428/1291* (2015.01); *Y10T 428/12556* (2015.01); *Y10T 428/12569* (2015.01); *Y10T 428/12611* (2015.01); *Y10T 428/12618* (2015.01); *Y10T 428/12667* (2015.01); *Y10T 428/12826* (2015.01); *Y10T 428/12847* (2015.01); *Y10T 428/12854* (2015.01); *Y10T 428/12882* (2015.01); *Y10T 428/12903* (2015.01); *Y10T 428/12944* (2015.01); *Y10T 428/264* (2015.01); *Y10T 428/265* (2015.01); *Y10T 428/31678* (2015.04); *Y10T 428/31681* (2015.04)

(58) Field of Classification Search
    CPC ..... Y10T 428/12847; Y10T 428/12854; Y10T 428/12882; Y10T 428/12903; Y10T 428/1291; Y10T 428/12944; Y10T 428/12826; Y10T 428/264; Y10T 428/265; Y10T 428/31678; Y10T 428/31681

See application file for complete search history.

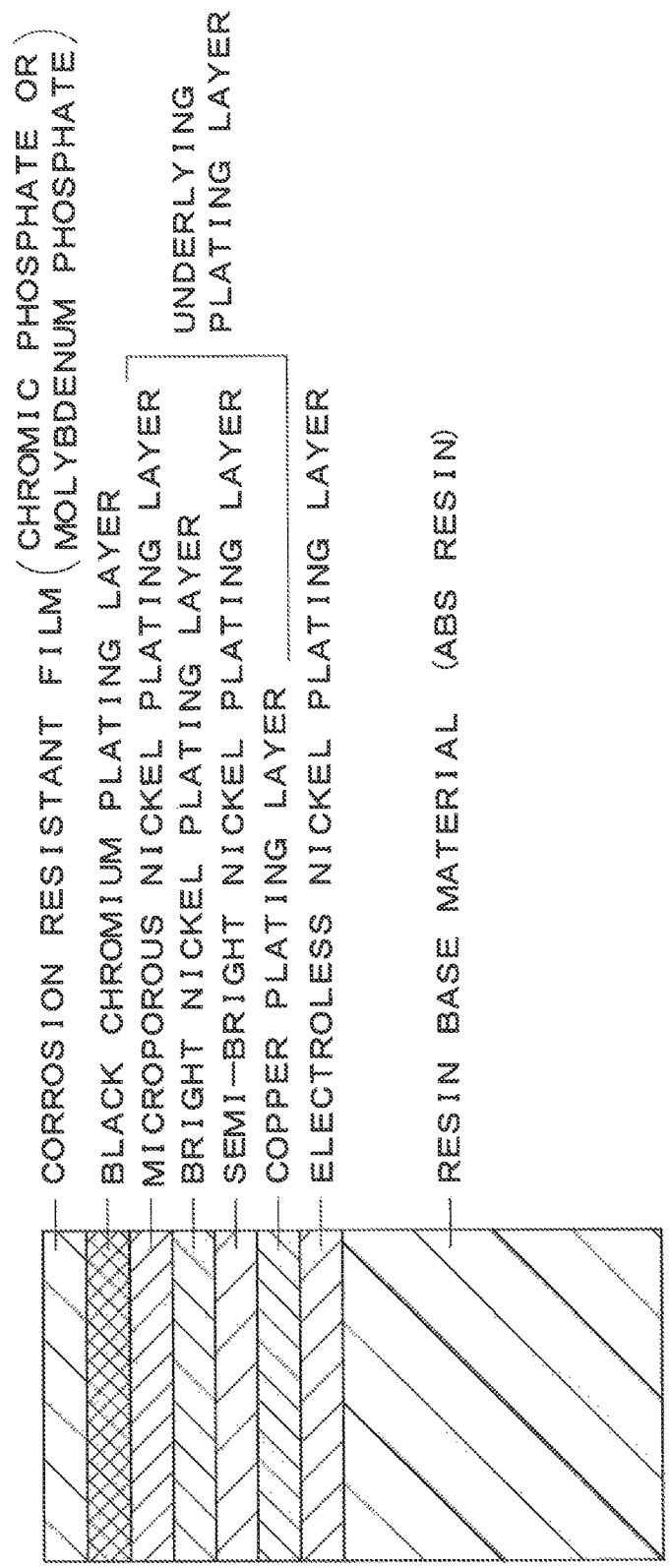

BLACK PLATED RESIN PART AND METHOD FOR MANUFACTURING THE SAME

TECHNICAL FIELD

The present invention relates to a black plated resin part used in a decorative part for a vehicle, a housing for an electrical product, or the like.

BACKGROUND ART

In fields such as a decorative part for a vehicle and a housing for an electrical product, there is an increasing demand for a deep-tone jet-black appearance from the viewpoints of design and the like. Although a jet black color can be obtained in a black plating layer according to cobalt chromium plating or the like (Patent Document 1), the black plating layer is poor in corrosion resistance.

Thus, a chromate film has been formed on the black plating layer by chromate treatment using hexavalent chromium for improvement in corrosion resistance. Consequently, although a corrosion resistance performance can be ensured, as the counteraction, there has been the problem that a hexavalent chromium component contained in the chromate film develops a strong yellow color, so that a jet black color of the black plating layer looks yellowish when the black plating layer is viewed through the chromate film.

CITATION LIST

Patent Document

Patent Document 1: Japanese Patent Application Publication No. 2014-100809

SUMMARY OF INVENTION

Technical Problem

Thus, an object of the present invention is to provide a black plated resin part which can ensure a corrosion resistance performance by a corrosion resistant film and does not allow a black plating layer with jet-black tone to look yellowish due to the corrosion resistant film.

Solution to Problem

The present inventors have found that when a black chromium plating layer is bright black in color in which an $L^*$ value is more than 54 based on the $L^*a^*b^*$ color system, it is unnoticeable that the black chromium plating layer looks yellowish due to a hexavalent chromium component of the chromate film, and, on the other hand, when the black chromium plating layer is dark (deep) black in color in which the $L^*$ value is not more than 54, it becomes noticeable that the black chromium plating layer looks yellowish, and the present inventors achieved the present invention as a result of intensive studies.

(1) A black plated resin part of the present invention includes a resin base material, an underlying plating layer including a copper plating layer and a nickel plating layer formed in this order on the resin base material, a black chromium plating layer formed on the nickel plating layer, formed of trivalent chromium, and having a film thickness of not less than 0.15 μm, and a corrosion resistant film formed on the black chromium plating layer, formed of chromic phosphate or molybdenum phosphate, and having a film thickness of not less than 7 nm. A brightness of the black chromium plating layer seen through the corrosion resistant film is expressed by an $L^*$ value of not more than 54 based on the $L^*a^*b^*$ color system.

(2) A method for manufacturing a black plated resin part of the present invention includes forming an underlying plating layer, including a copper plating layer and a nickel plating layer in this order on a resin base material, forming a black chromium plating layer, formed of trivalent chromium and having a film thickness of not less than 0.15 μm, on the nickel plating layer by electrolytic plating in a trivalent chromium plating bath, and forming a corrosion resistant film, formed of chromic phosphate or molybdenum phosphate and having a film thickness of not less than 7 nm, on the black chromium plating layer by chemical conversion treatment using a chemical conversion treatment solution.

Effects

When the black chromium plating layer has a film thickness of not less than 0.15 μm, color variation in a film thickness can be minimized. When the black chromium plating layer is deep black in color in which the $L^*$ value is not more than 54, if the corrosion resistant film on the black chromium plating layer develops a yellow color, it becomes noticeable that the black chromium plating layer looks yellowish. However, in the present invention, since the corrosion resistant film is formed of chromic phosphate (trivalent chromium) or molybdenum phosphate that does not substantially develop a yellow color, the black chromium plating layer does not look yellowish. When the corrosion resistant film has a film thickness of not less than 7 nm, a corrosion resistance performance can be ensured.

Advantageous Effects of Invention

The present invention can provide a black plated resin part which can ensure a corrosion resistance performance by a corrosion resistant film and does not allow a black plating layer with jet-black tone to look yellowish due to the corrosion resistant film.

BRIEF DESCRIPTION OF DRAWING

FIG. 1 is a sectional view of a black plated resin part of Examples 1 and 2 embodying the present invention.

DESCRIPTION OF EMBODIMENTS

1. Resin Base Material

A resin base material may be formed of thermoplastic resin or thermosetting resin and is not limited in particular. Examples of the resin include an acrylonitrile-butadiene-styrene copolymer (ABS) resin, a polycarbonate (PC) resin, a PC/ABS resin, an acrylic resin, a styrene resin, a polyamide resin, a polycarbonate resin, a polypropylene resin, a vinyl chloride resin, and a polyurethane resin. The ABS resin or the PC/ABS resin is preferable from the viewpoints of strength, durability, and the like.

A conductive layer required when a subsequent underlying plating layer is electrolytic plated is formed on the resin base material. The conductive layer is not limited in particular, and an electroless nickel plating layer may be used.

2. Underlying Plating Layer

The underlying plating layer contains a copper plating layer and a nickel plating layer in this order. The copper plating layer conforms well to the resin base material due to high ductility of the copper plating layer. The nickel plating layer maintains an excellent appearance of a black chromium plating layer and, at the same time, electrochemically prevents corrosion. A specific configuration of the nickel plating layer is not limited in particular, and one or a plurality of layers may be provided.

3. Black Chromium Plating Layer

It is more preferable that the black chromium plating layer has a film thickness of not less than 0.15 μm. Although the upper limit of the film thickness of the black chromium plating layer is not limited in particular, it is preferably 1 μm. If the thickness is more than 1 μm, film internal stress is large, so that cracking is apt to occur.

The color of the black chromium plating layer seen through a corrosion resistant film is preferably expressed by the L* value in the range of 44 to 50, an a* value in the range of 1.5 to −1.5, and a b* value is the range of 8 to −8 based on the L*a*b* color system, if the L* value is less than 44, black tone is too strong, and a metallic feeling is lost. If the a* value and the b* value are outside those ranges, each color tone (red, green, yellow, and blue) becomes strong.

If the black chromium plating layer contains Fe, it is preferable because the corrosion resistance is enhanced.

A trivalent chromium compound used in a trivalent chromium plating bath is not limited in particular, and examples of the trivalent chromium compound include chromium sulfate $(Cr_2(SO_4)_3)$ chromium alum $(CrK(SO_4)_2)$, chromium nitrate $(Cr(NO_3)_3)$, chromium chloride $(CrCl_3)$, and chromium acetate $(Cr(CH_3COO)_3)$.

4. Corrosion Resistant Film

Although the upper limit of the film thickness of the corrosion resistant film is not limited in particular, it is preferably 20 nm. If the film thickness is large, the corrosion resistant film is slightly whitened.

A chemical conversion treatment solution is an aqueous solution containing phosphoric acid and additive metal. When a chromic phosphate film is formed, additive metal is trivalent chromium, and when a molybdenum phosphate film is formed, additive metal is molybdenum.

The chemical conversion treatment may be performed by electroless treatment.

5. Application of Black Plated Resin Part

Decorative parts for vehicles (such as a radiator grill, a fender, a garnish, a wheel cap, a back panel, an air spoiler, and an emblem) and a housing for electrical products (such as a cell phone, a smart phone, a portable information terminal, and a game machine) can be exemplified. In particular, since the decorative parts for vehicles which are exposed to wind and rain are required to have a high corrosion resistance performance, the effectiveness achieved when the present invention is applied is high.

EXAMPLES

Black plated resin parts of Examples 1 and 2 shown in FIG. 1 and Table 1 were manufactured. For comparison, black plated resin parts of Comparative Examples 1 to 4 shown in Table 1 were manufactured. Then, color measurement and a corrosion resistance test were conducted.

TABLE 1

| | | Example 1 | Example 2 | Comparative Example 1 | Comparative Example 2 | Comparative Example 3 | Comparative Example 4 |
|---|---|---|---|---|---|---|---|
| Resin Base Material | ABS resin | ○ | ○ | ○ | ○ | ○ | ○ |
| Conductive Layer | Electroless Nickel Plating Layer | ○ | ○ | ○ | ○ | ○ | ○ |
| Underlying Plating Layer | Copper Plating Layer | ○ | ○ | ○ | ○ | ○ | ○ |
| | Semi-bright Nickel Plating Layer | ○ | ○ | ○ | ○ | ○ | ○ |
| | Bright Nickel Plating Layer | ○ | ○ | ○ | ○ | ○ | ○ |
| | Microporous Nickel Plating Layer | ○ | ○ | ○ | ○ | ○ | ○ |
| Black Plating Layer | Chromium Plating Layer ● μm | ○ | ○ | ○ | ○ | | |
| | Cobalt Chromium Plating Layer 1.5 μm | | | | | ○ | ○ |
| | Cobalt Oxide Layer | | | | | ○ | ○ |
| Corrosion Resistant Film | Chromic Phosphate Film 10 nm | ○ | | | | | |
| | Molybdenum Phosphate Film 10 nm | | ○ | | | | |
| | Hexavalent Chromium Chromate Film 10 nm | | | | | ○ | | ○ |
| Color Tone | L* | 52.46 | 51.83 | 52.01 | 51.11 | 51.65 | 48.25 |
| | a* | 0.67 | 0.68 | 0.67 | 0.97 | 0.26 | 0.76 |
| | b* | 4.38 | 4.64 | 4.36 | 7.2 | 1.85 | 3.95 |
| | Yellowish | Not Observed | Not Observed | Not Observed | Observed | Not Observed | Observed |
| Corrosion Resistance Performance | Rating Number | 9.3 | 9.3 | 7 | 9.3 | 4 | 7 |

Example 1

As shown in FIG. 1 and Table 1, the black plated resin part of Example 1 includes an ABS resin base material (with an electroless nickel plating layer as a conductive layer) an underlying plating layer including a copper plating layer, a semi-bright nickel plating layer, a bright nickel plating layer, and a macroporous nickel plating layer formed in this order on the resin base material, a black chromium plating layer formed on the nickel plating layer, formed of trivalent chromium, and having a film thickness of 0.2 μm, and a corrosion resistant film formed on the black chromium plating layer, formed of a chromic phosphate film, and having a film thickness of about 10 nm. The color of the black chromium plating layer seen through the corrosion resistant film is expressed by an L* value of 52.46, an a* value of 0.67, and a b* value of 4.38 based on the L*a*b* color system, and the black chromium plating layer is in jet-black in color. The black chromium plating layer does not look yellowish due to the corrosion resistant film.

In order to manufacture the black plated resin part of Example 1, a surface of the resin base material was first pretreated to have conductivity. In the pretreatment, the ABS resin base material was etched by being immersed in chromic acid, and a Pd/Sn metal complex was added to the surface after the etching treatment to achieve activation. After that, the electroless nickel plating layer as a conductive layer was formed thereon.

Subsequently, the resin base material to which the conductivity was given by pretreatment was subjected to underlying plating treatment. The underlying plating treatment was performed such that a resin base material was electrolytic plated by being immersed in metal plating baths of various kinds, whereby the copper plating layer, the semibright nickel plating layer, the bright nickel plating layer, and the microporous nickel plating layer were stacked in this order.

Next, black chromium plating treatment was applied to the underlying plating treated resin base material. The black chromium plating treatment was performed by immersing the underlying plating treated resin base material in a trivalent chromium plating bath and then performing electrolytic plating under conditions of a bath temperature of 40° C., a pH value of 3.2, a cathode current density of 10 A/dm$^2$, an anode current density of 10 A/dm$^2$, a film forming rate of 0.07 μm/min, and a plating time of 3 minutes, whereby a black chromium plating layer having a film thickness of 0.2 μm was formed on the microporous nickel plating layer. The used trivalent chromium plating bath was an aqueous solution containing the following components (a trivalent chromium compound is basic chromium sulfate contained in Trichrome additive), and the pH value was adjusted to 3.2 using hydrochloric acid of 35%.

Boric acid produced by Wako Pure Chemical Industries, Ltd. 63 g/L
Trichrome additive produced by Atotech Deutschland GmbH 400 g/L
Trichrome stabilizer produced by Atotech Deutschland GmbH 100 mL/L
Trichrome regulator produced by Atotech Deutschland GmbH 3 mL/L
Trichrome collector produced by Atotech Deutschland GmbH 2 mL/L
Trichrome graphite makeup produced by Atotech Deutschland GmbH 100 mL/L Next, chemical conversion treatment was applied to the black chromium plated resin base material. In the chemical conversion treatment, the black chromium plated resin base material was immersed in a chemical conversion treatment solution, and the chemical conversion treatment was performed by electroless treatment under conditions of a solution temperature of 25° C., a pH value of 1.3, and a chemical conversion treatment time of 60 seconds, whereby a chromic phosphate film having a film thickness of about 10 nm was formed on the black chromium plating layer. The used chemical conversion treatment solution was an aqueous solution (a phosphoric acid chromate treatment solution) containing 12.5 mL/L of a 89% phosphoric acid solution and 10 g/L of chromium sulfate as a trivalent chromium compound.

Example 2

As shown in FIG. 1 and Table 1, in the black plated resin part of Example 2, a resin base material, an underlying plating layer, and a black chromium plating layer are common to those of Example 1, and Example 2 differs from Example 1 only in that a corrosion resistant film is formed of a molybdenum phosphate film having a film thickness of about 10 nm. The color of the black chromium plating layer seen through the corrosion resistant film is expressed by an L* value of 51.83, an a* value of 0.68, and a b* value of 4.64 based on the L*a*b* color system, so that the black chromium plating layer is in jet-black in color. The black chromium plating layer does not look yellowish due to the corrosion resistant film.

In order to manufacture the black plated resin part of Example 2, the resin base material was subjected to first pretreatment, underlying plating treatment, and black chromium plating treatment as in Example 1.

Next, chemical conversion treatment was applied to the black chromium plated resin base material. In the chemical conversion treatment, the black chromium plated resin base material was immersed in a chemical conversion treatment solution, and the chemical conversion treatment was performed under conditions of a solution temperature of 30° C., a pH value of 12, a current density of 0.5 A/dm$^2$, and a chemical conversion treatment time of 180 seconds, whereby a molybdenum phosphate film having a film thickness of about 10 nm was formed on the black chromium plating layer. The used chemical conversion treatment solution was an aqueous solution containing 110 g/L of potassium sulfate, 13 mL/L of a 89% phosphoric acid solution, and 5 g/L of sodium molybdate dihydrate.

Comparative Example 1

As shown in Table 1, in the black plated resin part of Comparative Example 1, a resin base material, an underlying plating layer, and a black chromium plating layer are common to those of Example 1, and Comparative Example 1 differs from Example 1 only in that no corrosion resistant film is provided. The color of the black chromium plating layer is expressed by an L* value of 52.01, an a* value of 0.67, and a b* value of 4.36 based on the L*a*b* color system, so that the black chromium plating layer is in jet-black in color. As a matter of course, the black chromium plating layer does not look yellowish.

In order to manufacture the black plated resin part of Comparative Example 1, the resin base material was subjected to pretreatment, underlying plating treatment, and black chromium plating treatment as in Example 1.

Comparative Example 2

As shown in Table 1, in the black plated resin part of Comparative Example 2, a resin base material, an underlying plating layer, and a black chromium plating layer are common to those of Example 1, and Comparative Example 2 differs from Example 1 only in that a corrosion resistant film is formed of a hexavalent chromium chromate film having a film thickness of about 10 nm. The color of the black chromium plating layer seen through the corrosion resistant film is expressed by an L* value of 51.11, an a* value of 0.97, and a b* value of 7.2 based on the L*a*b* color system, so that the black chromium plating layer is in jet-black in color. The black chromium plating layer looks yellowish due to corrosion resistant film.

In order to manufacture the black plated resin part of Comparative Example 2, the resin base material was subjected to first pretreatment, underlying plating treatment, and black chromium plating treatment as in Example 1.

Next, chemical conversion treatment was applied to the black chromium plated resin base material. In the chemical conversion treatment, the black chromium plated resin base material was immersed in a chemical conversion treatment solution, and the chemical conversion treatment was performed under conditions of a solution temperature of 40° C., a pH value of 3.0, a current density of 0.5 A/dm$^2$, and a chemical conversion treatment time of 180 seconds, whereby a hexavalent chromium chromate film having a film thickness of about 10 nm was formed on the black chromium plating layer. The used chemical conversion treatment solution was a 25% by weight aqueous solution of chromic anhydride.

Comparative Example 3

As shown in Table 1, in the black plated resin part of Comparative Example 3, a resin base material and an underlying plating layer are common to those of Example 1, and Comparative Example 3 differs from Example 1 in that a black plating layer is constituted of a cobalt chromium plating layer and a cobalt oxide layer thereon and in that no corrosion resistant film is provided. The color of the black plating layer is expressed by an L* value of 51.65, an a* value of 0.26, and a b* value of 1.85 based on the L*a*b* color system, so that the black plating layer is in jet-black in color. As a matter of course, the black plating layer does not look yellowish.

In order to manufacture the black plated resin part of Comparative Example 3, the resin base material was subjected to pretreatment and underlying plating treatment as in Example 1.

Next, black cobalt chromium plating treatment was applied to the underlying plating treated resin base material. Black plating treatment was performed by immersing the underlying plating treated resin base material in a cobalt chromium plating bath and then performing electrolytic plating under conditions of a bath temperature of 50° C., a pH value of 3.5, a cathode current density of 10 A/dm$^2$, an anode current density of 5 A/dm$^2$, a film forming rate of 0.1 μm/min, and a plating time of 15 minutes, whereby a black cobalt chromium plating layer having a film thickness of 1.5 μm and formed of a cobalt chromium based alloy was formed on the microporous nickel plating layer. The used cobalt chromium plating bath was a sulfate solution in which a concentration of a metal content of $Cr^{3+}$ is 30 g/L and a concentration of a metal content of $Co^{2+}$ is 3 g/L and contains other components such as conductive salt, a pH buffering agent, and a surface conditioner.

Subsequently, the black cobalt chromium plated resin base material was taken out, and the surface was subjected to acid immersion treatment to form the cobalt oxide layer. The acid immersion treatment was performed by immersing the resin base material in a treatment tank filled with an organic acid having a pH value of 1.5 and holding the resin base material at a treatment temperature of 50° C. for 10 minutes. This acid immersion treatment caused a surface layer portion of the black cobalt chromium plating layer to be oxidized to form the cobalt oxide layer, and, thus, to make the surface layer portion to become more blackish, whereby a jet-black tone was provided.

Comparative Example 4

As shown in Table 1, in the black plated resin part of Comparative Example 4, a resin base material and an underlying plating layer are common to those of Example 1, and Comparative Example 4 differs from Example 1 in that a black plating layer is common to that of Comparative Example 3 and in that a corrosion resistant film is formed of a hexavalent chromium chromate film having a film thickness of about 10 nm. The color of the black chromium plating layer is expressed by an L* value of 48.25, an a* value of 0.76, and a b* value of 3.95 based on the L*a*b* color system, so that the black chromium plating layer is in jet-black in color. The black chromium plating layer looks yellowish due to corrosion resistant film.

In order to manufacture the black plated resin part of Comparative Example 4, the resin base material was subjected to pretreatment and underlying plating treatment as in Example 1 and then subjected to black cobalt chromium plating treatment and acid immersion treatment as in Comparative Example 3.

Next, chemical conversion treatment was applied to the black plated resin base material. In the chemical conversion treatment, the black plated resin base material was immersed in a chemical conversion treatment solution, and the chemical conversion treatment was performed under conditions of a solution temperature of 40° C., a pH value of 3.0, a current density of 0.5 A/dm$^2$, and a chemical conversion treatment time of 5 minutes, whereby a hexavalent chromium chromate film having a film thickness of about 10 nm was formed on the black plating layer. The used chemical conversion treatment solution was a 25% by weight aqueous solution of chromic anhydride.

Samples of the manufactured black plated resin parts of Examples 1 and 2 and Comparative Examples 1 to 4 were subjected to color measurement and the corrosion resistance test according to the CASS test.

<Color Measurement>

The colors of the black plating layers were measured with a spectrophotometric colorimeter (CM-700d manufactured by KONICA MINOLTA HOLDINGS, INC.) (the black plating layer having a corrosion resistant film was seen through the corrosion resistant film) under measurement conditions in which a measuring mode was an SCI mode, an observation condition was a 10-degree visual field, an observation light source was D65, and measurement diameter/light diameter=φ3/φ6. Each measured value based on the L*a*b* color system was as described above (Table 1).

<Corrosion Resistance Test>

A CASS test (JIS H 8502) was conducted under the following conditions.

Test solution: 40 g/L of sodium chloride, 0.205 g/L of cupric chloride, pH value of 3.0
Temperature of saturator: 63° C.
Temperature of test tank: 50° C.
Spraying quantity: 1.5 mL/80 cm$^2$/h
Compressed air pressure: 0.98 MPa
Sample setting angle: 30°
Test time: 50 h After the CASS test, the sample was taken out to be washed with water and wiped dry, whereby a rating number was determined by comparing a corroded state of the surface with a rating number table (Table 1). The samples in which the rating number was not less than 8 were judged to be acceptable.

Note that the present invention is not limited to the above examples, and modification may be suitably made for practical use, without departing from the purpose of the present invention.

The invention claimed is:
1. A black plated resin part comprising:
a resin base material;
an underlying plating layer including a copper plating layer and a nickel plating layer formed in this order on the resin base material;

a black chromium plating layer formed on the nickel plating layer and having a film thickness of not less than 0.15 µm; and a corrosion resistant film formed on the black chromium plating layer, formed of chromic phosphate or molybdenum phosphate, and having a film thickness of not less than 7 nm, wherein the black chromium plating layer is formed on the nickel plating layer from a plating bath containing trivalent chromium compounds, and wherein a color of the black chromium plating layer seen through the corrosion resistant film is expressed by the L* value in the range of 44 to 50, an a* value in the range of 1.5 to −1.5, and a b* value in the range of 8 to −8 based on the L*a*b* color system.

2. The black plated resin part according to claim 1, being a decorative part for a vehicle.

3. The black plated resin part according to claim 1, wherein the trivalent chromium compounds are selected from the group consisting of chromium sulfate, chromium nitrate, chromium chloride and chromium acetate.

4. A black plated resin part comprising:
a resin base material;
an underlying plating layer coated on the resin base material including a copper-plated layer on the resin base material and a nickel-plated layer on the copper-plated layer;
a black-chromium plating layer formed from trivalent chromium compounds coated on the nickel plating layer having a film thickness of not less than 0.15 µm; and
a corrosion resistant treatment film provided on the black chromium plating layer having a film thickness of not less than 7 nm, the corrosion resistant treatment film being achieved using a chemical conversion treatment solution containing a member selected from the group consisting of chromic phosphate and molybdenum phosphate, wherein
a color of the black chromium plating layer seen through the corrosion resistant film is expressed by the L* value in the range of 44 to 50, an a* value in the range of 1.5 to −1.5, and a b* value in the range of 8 to −8 based on the L*a*b* color system.

5. The black plated resin part according to claim 4 configured as a decorative part for a vehicle.

6. The black plated resin part according to claim 4, wherein the trivalent chromium compounds are selected from the group consisting of chromium sulfate, chromium nitrate, chromium chloride and chromium acetate.

7. A method for manufacturing a black plated resin part, the method comprising:
forming an underlying plating layer, including a copper plating layer and a nickel plating layer in this order on a resin base material;
forming a black chromium plating layer having a film thickness of not less than 0.15 µm on the nickel plating layer by electrolytic plating; and
forming a corrosion resistant film having a film thickness of not less than 7 nm on the black chromium plating layer by chemical conversion treatment using a chemical conversion treatment solution containing a member selected from the group consisting of chromic phosphate and molybdenum phosphate,
wherein the black chromium plating layer is formed on the nickel plating layer from a plating bath containing trivalent chromium compounds, and
wherein a color of the black chromium plating layer seen through the corrosion resistant film is expressed by the L* value in the range of 44 to 50, an a* value in the range of 1.5 to −1.5, and a b* value in the range of 8 to −8 based on the L*a*b* color system.

8. The method for manufacturing a black plated resin part according to claim 7, wherein the chemical conversion treatment solution comprises phosphoric acid, and trivalent chromium as an additive metal.

9. The method for manufacturing a black plated resin part according to claim 7, wherein the chemical conversion treatment solution comprises phosphoric acid, and molybdenum as an additive metal.

10. The method for manufacturing a black plated resin part according to claim 7, wherein the chemical conversion treatment is electroless treatment.

* * * * *